(12) United States Patent
Buquet et al.

(10) Patent No.: US 12,652,453 B2
(45) Date of Patent: Jun. 9, 2026

(54) OPTICAL SYSTEM WITH LOCALIZED MAGNIFICATION

(71) Applicant: ImmerVision, Inc., Montreal (CA)

(72) Inventors: Julie Buquet, Montreal (CA); Patrice Roulet, Montreal (CA); Jocelyn Parent, Lavaltrie (CA); Pierre Konen, Saint-Bruno (CA); Simon Thibault, Quebec City (CA)

(73) Assignee: IMMERVISION, INC., Montreal (CA)

( * ) Notice: Subject to any disclaimer, the term of this patent is extended or adjusted under 35 U.S.C. 154(b) by 324 days.

(21) Appl. No.: 18/244,438

(22) Filed: Sep. 11, 2023

(65) Prior Publication Data

US 2024/0089579 A1     Mar. 14, 2024

Related U.S. Application Data

(60) Provisional application No. 63/405,140, filed on Sep. 9, 2022.

(51) Int. Cl.
*H04N 23/20*     (2023.01)
*G06V 10/25*     (2022.01)
*G06V 10/44*     (2022.01)
*G06V 20/59*     (2022.01)
*G06V 40/16*     (2022.01)
*H04N 23/611*     (2023.01)

(52) U.S. Cl.
CPC ........... *H04N 23/611* (2023.01); *G06V 10/25* (2022.01); *G06V 10/44* (2022.01); *G06V*

*20/59* (2022.01); *G06V 40/162* (2022.01); *G06V 40/166* (2022.01); *H04N 23/20* (2023.01)

(58) Field of Classification Search
CPC ...... H04N 23/611; H04N 23/20; G06V 20/59; G06V 10/25; G06V 40/162; G06V 10/44; G06V 40/166
See application file for complete search history.

(56) References Cited

U.S. PATENT DOCUMENTS

| | | |
|---|---|---|
| 6,844,990 B2 | 1/2005 | Artonne et al. |
| 6,865,028 B2 | 3/2005 | Moustier et al. |
| 9,829,700 B2 | 11/2017 | Parent et al. |

(Continued)

OTHER PUBLICATIONS

Parent et al., "Locally Magnifying Imager," Optrics Express, vol. 19, No. 6, pp. 5676-5689, Mar. 14, 2011.

(Continued)

*Primary Examiner* — Syed Haider
(74) *Attorney, Agent, or Firm* — Panitch Schwarze Belisario & Nadel LLP

(57) ABSTRACT

Embodiments described herein are directed to optical systems creating an optical image on an image sensor, the optical image having at least one foveated region of interest created using at least one localized magnification optical feature on an optical surface. The optical system can be useful to increase the number of infrared pixels that are used to image a specific target which is only in a part of the object scene, while still being able to image the whole scene in the RGB part of the spectrum. In a preferred embodiment, the optical system is used in an automotive scenario to image with higher resolution the driver in order to more efficiently run face tracking and recognition algorithms.

18 Claims, 6 Drawing Sheets

(56)          References Cited

U.S. PATENT DOCUMENTS

| 11,748,991 | B1 * | 9/2023 | Day | B60Q 3/85 |
| | | | | 348/143 |
| 2003/0234867 | A1 | 12/2003 | Fujita et al. | |
| 2007/0031041 | A1 * | 2/2007 | Ko | G06V 40/162 |
| | | | | 382/190 |
| 2014/0078314 | A1 * | 3/2014 | Dowski, Jr | G02B 27/0075 |
| | | | | 235/462.07 |
| 2015/0268464 | A1 * | 9/2015 | Ranalli | G02B 13/06 |
| | | | | 348/36 |
| 2017/0343822 | A1 * | 11/2017 | Border | G02B 5/3083 |
| 2020/0012872 | A1 | 1/2020 | Autran | |
| 2021/0124916 | A1 * | 4/2021 | Boon | G06V 10/25 |
| 2021/0392297 | A1 * | 12/2021 | Liu | G06V 20/597 |

OTHER PUBLICATIONS

Parent et al., "Active Imaging Lens with Real-time Variable Resolution and Constant Field of View," Proc. SPIE 7652, International Optical Design Conference 2010, vol. 7652, pp. 76522F-1-12, Sep. 9, 2010.

International Search Report and Written Option issued Jan. 11, 2024 in International Application No. PCT/IB2023/059005.

* cited by examiner

100

150

400

450

OPTICAL SYSTEM WITH LOCALIZED MAGNIFICATION

CROSS-REFERENCE TO RELATED APPLICATIONS

This application claims the benefit of U.S. Provisional Patent Application No. 63/405,140, filed Sep. 9, 2022, entitled "Optical system with localized magnification," currently pending, the entire contents of all of which are incorporated by reference herein.

BACKGROUND OF THE INVENTION

Embodiments of the present invention relate to the field of optical systems and their design and, more particularly, to the design on an optical system having at least one non-symmetrical zone of interest created with at least one optical feature of higher optical power. A method to have such an optical system creating a zone of interest is presented.

Modern automotive design uses more and more camera and optical systems to image what is going on inside and outside the vehicle. The more information available to the various on-board algorithms allows for the car to better assist the driver and passengers. For example, wide-angle color images of the whole car are becoming more frequent in order to see what is happening inside the car for various reasons. Some examples could be adjusting the airbag status based on a detected person or object on a seat, alerting the driver in case of distractions, remote connection to the camera to check the content inside the car as desired, a system for sending an alarm if a child or animal is detected as being left alone inside the car, and others. In addition to the wide-angle view of the whole car interior, there are also many applications that benefit from looking at the driver in high resolution, including checking the gaze direction, looking for tired driving or drowsy driving, checking for the distraction status of the driver, and others. Often, these cameras looking at the driver are in the infrared part of the spectrum, in part in order to have illumination at night without blinding the driver and to run some specific algorithms independently of visible light level.

In recent years, there has been an increasing number of image sensors combining visible (RGB) and infrared (IR) imaging using different filters for each pixel of the sensor. These image sensors can be used to simultaneously image the full wide-angle view of the car interior in RGB color and the narrow view of the driver's face in IR color. However, in such RGB-IR sensors, the IR pixels only represent a small portion of the total number of pixels, often ¼ or less. The resulting image resolution on the driver's face is often insufficient to run all the required face tracking and analyzing algorithms. Increasing the total number of pixels of the camera is not always a solution in order to improve the resolution on the driver face as it requires increasing it everywhere, adding cost and increasing size for the whole optical system. There is a need for a foveated imaging system with increased resolution only on the driver's face or other zone of interest.

Some existing foveated imaging systems have been proposed in the past to increase the resolution in a narrow part of a wider field of view. However, these systems are either using multiple cameras or using rotationally symmetrical distortion from the optical system to increase the number of pixels in a part of the image as in U.S. Pat. No. 6,844,990 with rotational symmetry or in U.S. Pat. No. 6,865,028 without rotational symmetry. The use of localized power on a reflective surface of a real-time deformable mirror has also been proposed in the past, as in "Locally magnifying imager," Opt. Express 19, 5676-5689 (2011), in "Active imaging lens with real-time variable resolution and constant field of view", Proc. of SPIE 7652, 76522F (2010), or in U.S. Pat. No. 9,829,700, but only within one part of the spectrum and never with a standard refractive optical element with added feature of localized power. There has also never been a method using localized optical features with optical power on a standard optical lens in order to create localized zones of interest off-axis of an optical system to help the algorithm in one part of the spectrum while still allowing to keep imaging the full field of view in another part of the spectrum as is required for example, not limited to, in automotive applications.

BRIEF SUMMARY OF THE INVENTION

The present disclosure describes a method for creating a zone of interest in an optical image. The first step of the method is to provide an optical system with an optical axis, the optical system including a plurality of optical elements configured to create an optical image in an image plane. The second step is to provide, on at least one of the plurality of optical elements, at least one feature of localized optical power making the at least one optical element non-symmetrical with respect to the optical axis. An optical image formed by the optical system and the at least one feature of localized optical power includes at least one zone of interest that is non-symmetrical with respect to the optical axis, the at least one zone of interest being located at a predetermined distance from the optical axis in a first direction and having a first magnification. The optical image formed by the optical system and the at least one feature of localized optical power also has a reference region located outside the zone of interest, the reference region being located at the predetermined distance from the optical axis in a second direction different than the first direction and having a second magnification different than the first magnification.

Embodiments further include a method to design such an optical system using at least one optical feature creating a local optical power to locally increase magnification in part of an image, while keeping the total field of view of the optical system. The at least one optical feature added can be located at any position and on any surface of the optical system, but is generally as far as possible from the aperture stop in order to have the largest separation possible between the various fields imaging the object scene.

The optical system is used in a preferred embodiment in a camera using an RGB-IR image sensor used inside an automotive vehicle. In that case, the method further includes providing an image sensor at the image plane of the optical system to convert the optical image into a digital image. And in certain preferred embodiments, the image sensor is an RGB-IR image sensor. The full field of view of the optical system is used to image the full scene as required, while the zone of interest created by the local optical magnification feature is used to image the zone of interest with higher magnification, as for example, the face of the driver in one preferred embodiment. In some embodiments, at least one of the color image or the IR image is either displayed or processed by an algorithm unit to extract some relevant information.

In this example, when the RGB image is used, the RGB-IR image sensor creates an RGB digital image and the method further includes providing a processor configured to receive the RGB digital image and to dewarp the RGB digital image to remove the at least one zone of interest. Also in this example, when the IR image is used, the RGB-IR image sensor creates an IR image and the method further includes providing a processor configured to receive the IR image and to further process the IR image by an algorithm. In some further embodiments, the algorithm is configured to analyze a human face. A processor may be any device able to execute hardware or software algorithms to process, analyze, and/or transform an image, including a CPU, a GPU, an ASIC, a FPGA or any other device able to transform the image.

In some embodiments according to the present invention, the localized magnified zone can be of any size, shape or magnification depending on which object needs to be enlarged in the scene.

In some embodiments, a half field of view of the optical system in the first direction is the same as a half field of view of the optical system in the second direction.

In some embodiments, there are multiple optical surfaces each having a feature creating a localized optical power, all the surfaces working together to create the desired magnification while keeping the image quality (MTF) at a good level.

In some embodiments, the added optical feature on an optical surface can be of the same material as the optical element on which it is located or in any other optical material, including metamaterial or active optical element.

In some embodiments, the optical system is used with any two wavelengths of the electromagnetic spectrum, for example ultraviolet, color, near infrared, far infrared or the like.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
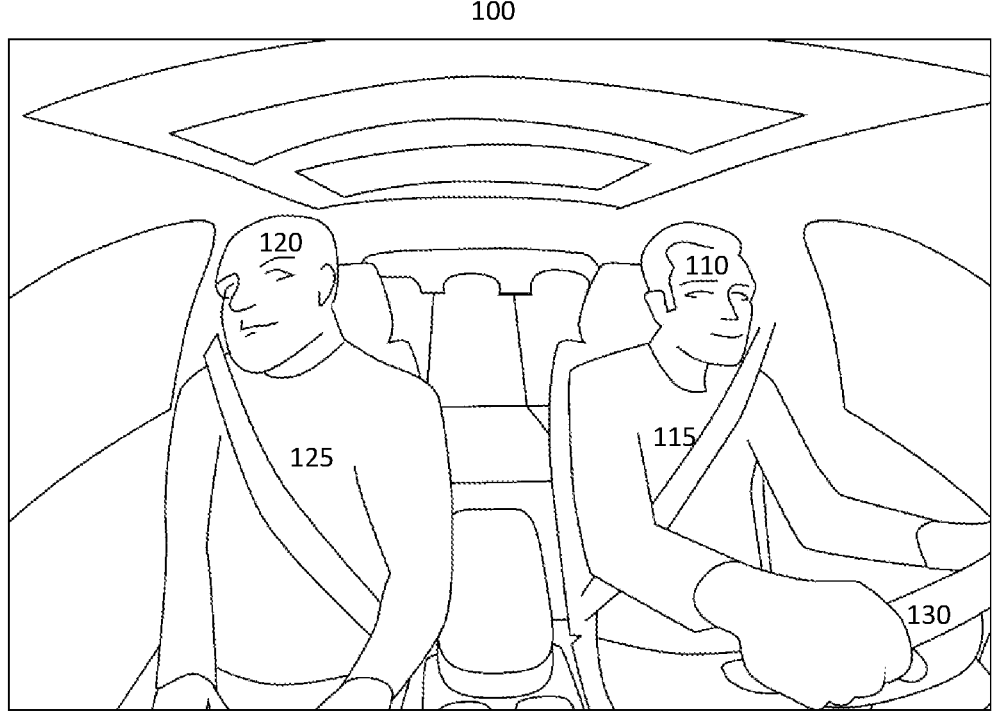
FIG. 1 shows a conventional view from an in-cabin monitoring camera.
Figure 1:
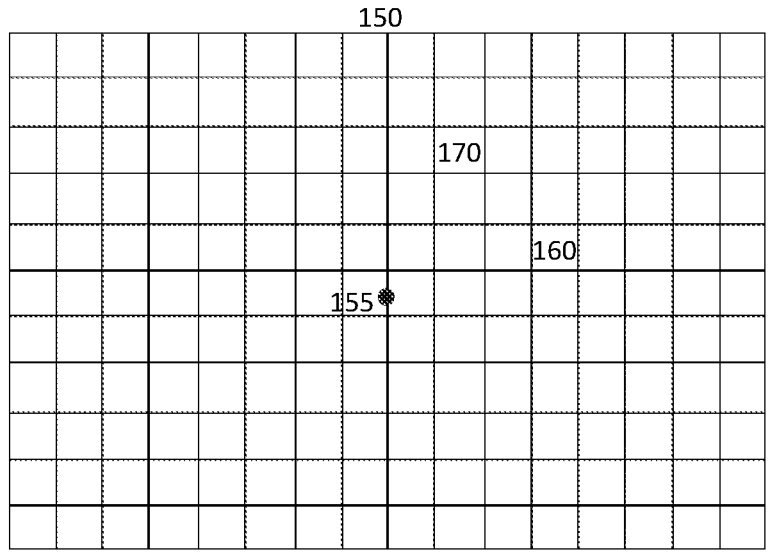

FIG. 1 shows the typical resulting image 100 of a camera according to the prior art looking at both the driver and a passenger inside an automotive vehicle. This camera could be located anywhere inside the automotive vehicle, but is typically placed on or near the rearview mirror in order to view the full interior of the car with a single wide-angle lens. The driver 115 is seen on the right side of the image, as schematized by him holding the steering wheel 130 of the car. The passenger 125 is seen on the left side of the image. In this example image for a camera according to the prior art, the head 110 of the driver has normal proportions compared to the rest of the image since the camera according to the prior art does not locally increase the resolution in a zone of interest. No matter what the projection of the optical system in this example is, it is rotationally symmetric around the optical axis, represented here by the dot 155 in the center of the image sensor. This projection could be rectilinear, equidistant, stereographic, orthographic, equisolid or any other custom projection. The mesh grid 150 is made of straight lines, showing schematically that no additional foveated zone is created by the optical system using optical elements with localized optical power, but does not necessarily represent a constant magnification. Because there is no zone of interest added, all squares, including the selected 160 and 170, are of equal size.

Figure 2:
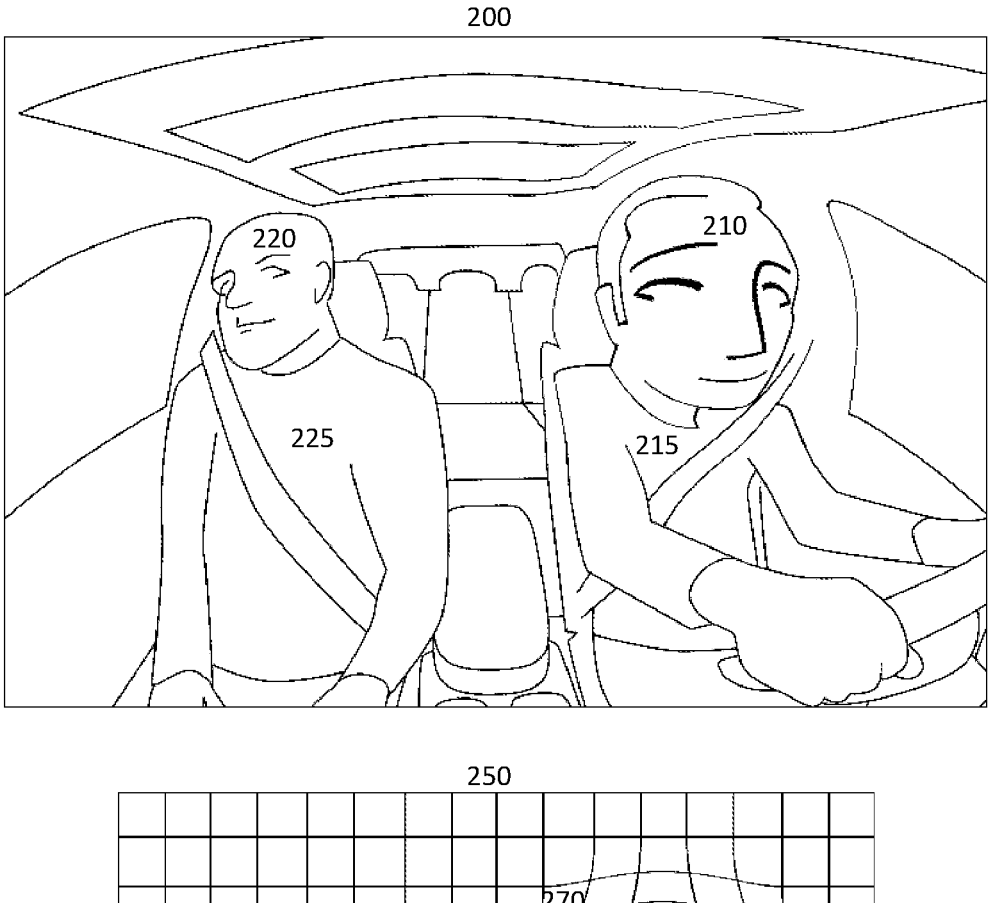
FIG. 2 shows how the foveated imaging optical system described herein is used to increase the resolution on the driver's face.

FIG. 2 shows an example of a foveated image resulting from a camera using an optical system built according to an example method of the present invention with non-rotationally symmetrical increased magnification centered on the driver inside an automotive vehicle. The image 200 is an example image resulting from a camera using a foveated imaging system according to an example embodiments of the present invention. Compared to the normal image of FIG. 1, this image has a localized zone of increased magnification on the face 210 of the driver 215 and a normal resolution on the passenger 225 having a face 220. Using the increased magnification, some face tracking or face analysis algorithms that require a high number of pixels on the face can be executed without having to further increase the total resolution of the sensor, which would mean additional cost and processing in the camera. As will be explained in FIG. 3, this is especially useful when the image sensor in the camera is an RGB-IR sensor, combining color image channels (Red, Green and Blue) to an IR channel. These face analysis or tracking algorithms often require IR light and imaging, but when only ¼ of the pixels on the sensor are sensitive to IR light, only ¼ of the total resolution can be used for these algorithms and a localized magnification on the face will greatly improve the results. The mesh 250 shows schematically this localized zone of interest created using at least one element with localized optical power. The square 260 is bigger than the corresponding square 160 in FIG. 1, allowing more pixels in an equal part of the object (represented by an angular distance in an object scene or a distance in an object plane).

In some embodiments according to the present invention, the magnification measured as a number of pixels/degree along any direction and for at least one field position in the zone of interest is at least ±10% lower or higher than the number of pixels/degree along the same direction and at the same field position before adding the localized feature. In other words, the difference of magnification between the zone of interest located at a predetermined distance from the optical axis and in a first direction and the reference region located at the same predetermined distance from the optical axis but in a second direction is at least ±10%. In this FIG. 2, the optical axis is represented by the dot 255, located at the center of the image sensor, but in some embodiments, the center of the optical image and the optical axis are offset with respect to the center of the image sensor. The zone of interest 260 is at a predetermined distance and in a first direction from the optical axis, represented by the arrow 280. This zone of interest is compared to a reference region 295 located at the same predetermined distance from the optical axis, but in a second, different direction, represented by the arrow 290. The mesh also includes squares of smaller size, like for example the square 270 which is smaller than the corresponding square 170 in FIG. 1, showing a compression around the object of interest. This compression is used to compensate for the magnified zone and thus allows imaging of the same total field of view on the image sensor of the camera, without affecting the projection outside of the magnified zone. As before, the projection outside of the magnified zone can be of any kind, including rectilinear, equidistant, stereographic, orthographic, equisolid or any other custom projection. In the example of FIG. 2, the magnification in the zone of interest is of gaussian shape, but it can be of any shape, including having a central area of the zone of interest after a transition zone where the resolution is constant across a plateau. In other embodiments, instead of having a constant resolution in a part of the zone of interest after a transition zone, the resolution can follow any projection, including rectilinear, equidistant, stereographic, orthographic, equisolid or any other custom projection. This is especially useful when the algorithm running on the pixels inside the zone of interest must be executed on a defined projection and we want to avoid dewarping the zone of interest to create that defined projection.

Figure 3:
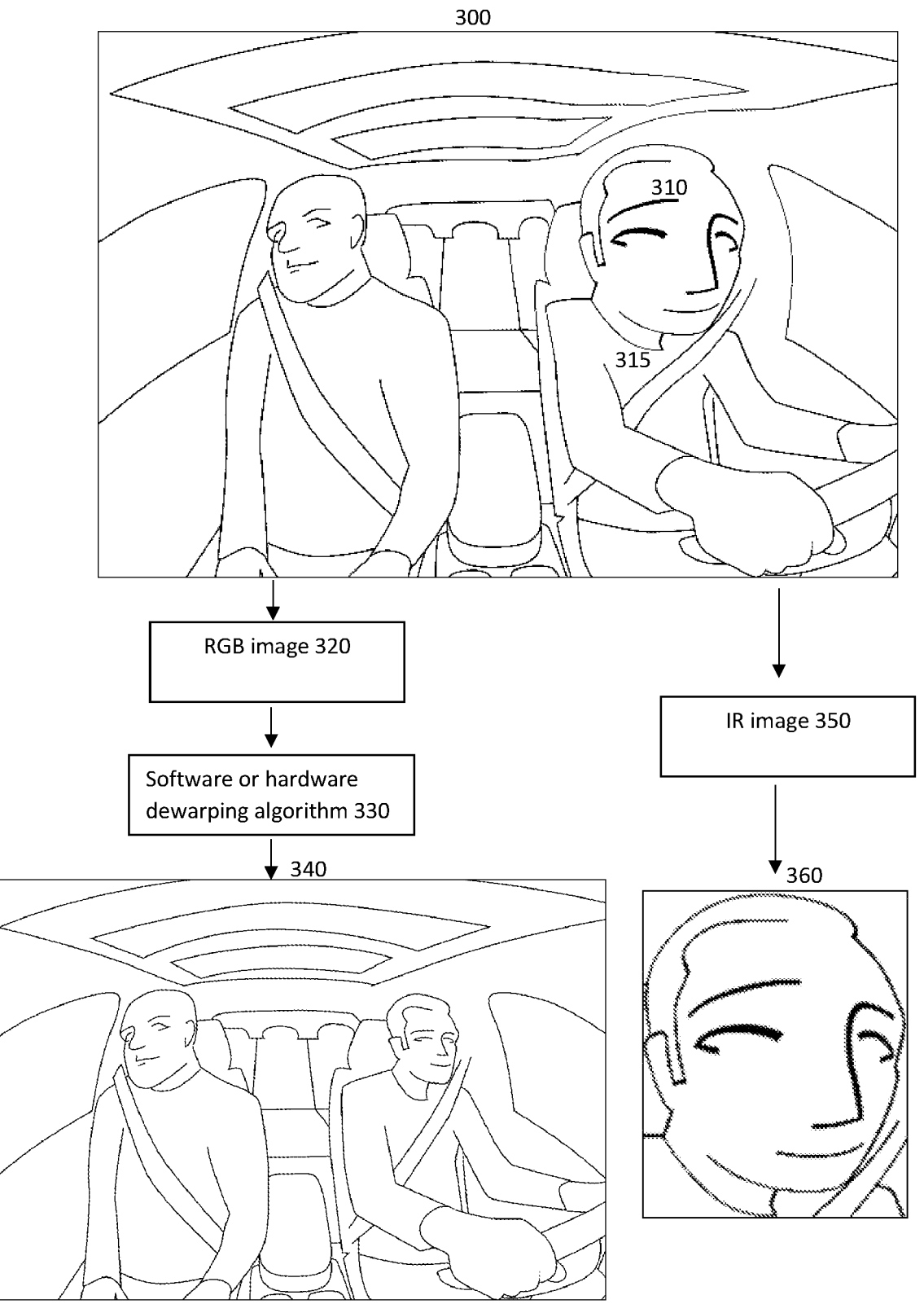
FIG. 3 shows how the increased resolution on the driver's face is used directly for the IR channel and dewarped into a normal image for the RGB channels.

FIG. 3 shows how the resulting image from the camera according to an example embodiment of the present invention can be further used by a processing inside the car. The optical imaging system with at least one optical element with localized optical power creates an optical image with an area of increased magnification on the face 310 of the driver. By placing an image sensor made of any number of pixels in the optical image plane, the image sensor can convert the optical image from the optical system to a digital image that can either be passed directly to the processing or recorded in an intermediate digital file. More precisely, this digital image includes multiple channels depending on the spectral response of the image sensor. In one preferred embodiment, the image sensor is an RGB-IR sensor, in which ¼ of the pixels are covered with a filter allowing mostly the red light to pass, ¼ of the pixels are covered with a filter allowing mostly the green light to pass, ¼ of the pixels are covered with a filter allowing mostly the blue light to pass and ¼ of the pixels are covered with a filter allowing mostly the infrared light to pass. In some other sensors, ratios other than exactly ¼ of each type could be used. The resulting digital image from this RGB-IR sensor is then a color image 320 after some processing is done to recreate a color image (debayering process, often done by an image signal processor, ISP) and an IR image. In one preferred embodiment, this color image is then sent to a software or hardware dewarping algorithm 330 to create the dewarped color image 340. The software or hardware dewarping algorithm knows exactly the shape, size and amplitude of the localized magnification increase created by the optical system and is thus able to invert it by correcting the distortion the optical system added to the image. The dewarped color image can then be used by any existing algorithm or shown to any human that needs to analyze what is happening in the full car at any moment. Since the localized distortion is removed, the existing algorithm can work with this dewarped color image 340 without any additional modification. On the other side, the IR channel of the original digital image is used to create the IR image 350, generally having ¼ of the total resolution of the digital image file when the IR pixels represent ¼ of the total pixels of the image sensor. This IR image 350 can then be further cropped to the cropped IR image 360 to be used by any algorithm that needs a high-resolution image of the face. Optional dewarping could also be applied here before analyzing the image in order to use existing image analysis algorithms.

Figure 4:
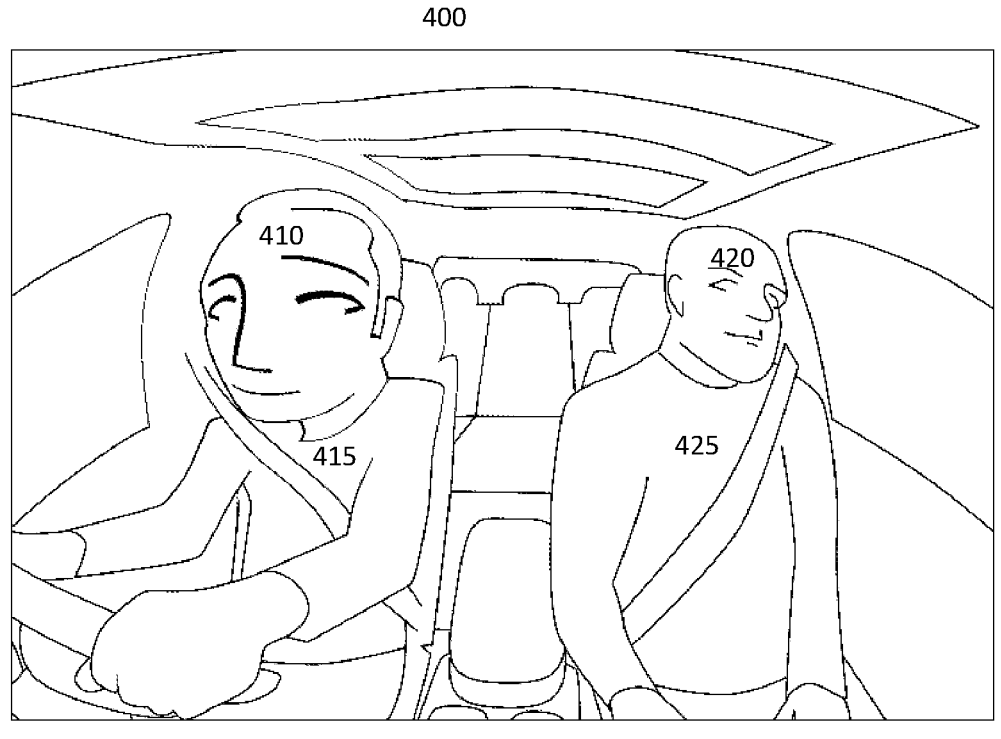
FIG. 4 shows how the camera system is reversible for when the driver is on the alternate side of the car.
Figure 4:
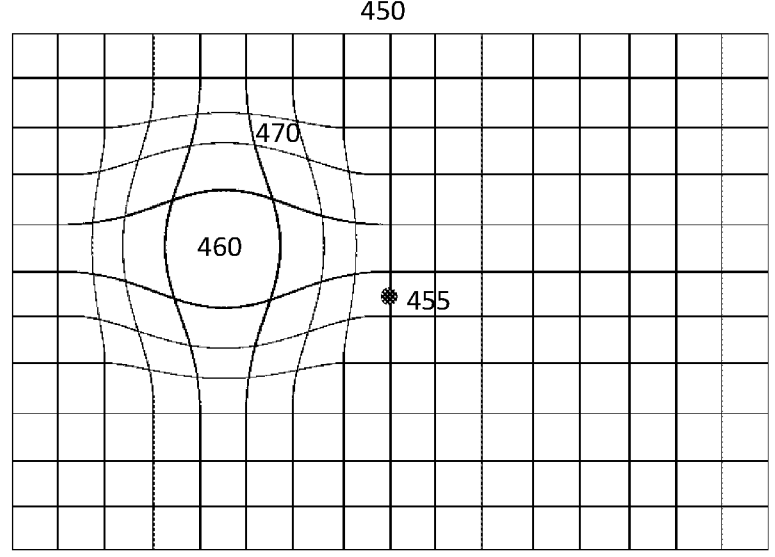

FIG. 4 shows how the camera system is reversible for cars in which the driver is on the alternate side of the car, as is the case in some regions of the world. Similar to the example of FIG. 2, the image 400 is an example image resulting from a camera using a foveated imaging system according to the present invention. Compared to the normal image of FIG. 1, this image has a localized zone of increased magnification on the face 410 of the driver 415 and a normal resolution on the passenger 425 having a face 420. Compared to the example of FIG. 2, the area of increased resolution is on the opposite side. In some embodiments of the present invention, the zone of interest 460 is perfectly centered and symmetrical with respect to the vertical axis of the sensor and a simple rotation by 180° of the optical system, without rotating the image sensor, is enough in order to switch the area of interest from one side to the other. However, in some other embodiments according to the present invention, the area of higher magnification 460 is not vertically centered on the image sensor as in the example schematized by the mesh 450 in which the area 460 is above the central line (vertical square number 5 out of 11 from the top instead of square number 6 for a centered area of interest), and a rotation of the optical system by another angle than a complete 180° is required. This required rotation angle is defined by the angle that the area of interest does with respect to the center of the optical system (optical axis) and the center of the image sensor. In this FIG. 4, the optical axis is represented by the dot 455. These two centers can be located at the same position or not depending on the embodiment. In the example schematic 450, the center of the zone 460 is located at a distance of 3.5 square horizontally and 1 square vertically from the center of the sensor, hence the angle of the area of interest is ≈74.05° and the rotation angle of the optical system is two times that, or ≈148.11°. The mesh 450 shows schematically the localized zone of interest created using at least one element with localized optical power. The square 460 is bigger than the corresponding square 160 in FIG. 1, allowing more pixels in an equal part of the object (represented by an angular distance in an object scene or a distance in an object plane). The mesh also includes squares of smaller size, like for example the square 470 which is smaller than the corresponding square 170 in FIG. 1, showing a compression around the object of interest. This compression is used to compensate for the magnified zone and thus allowing imaging of the same total field of view on the image sensor of the camera, without affecting the projection outside of the magnified zone. As before, the projection outside of the magnified zone can be of any kind, including rectilinear, equidistant, stereographic, orthographic, equisolid or any other custom projection.

Figure 5:
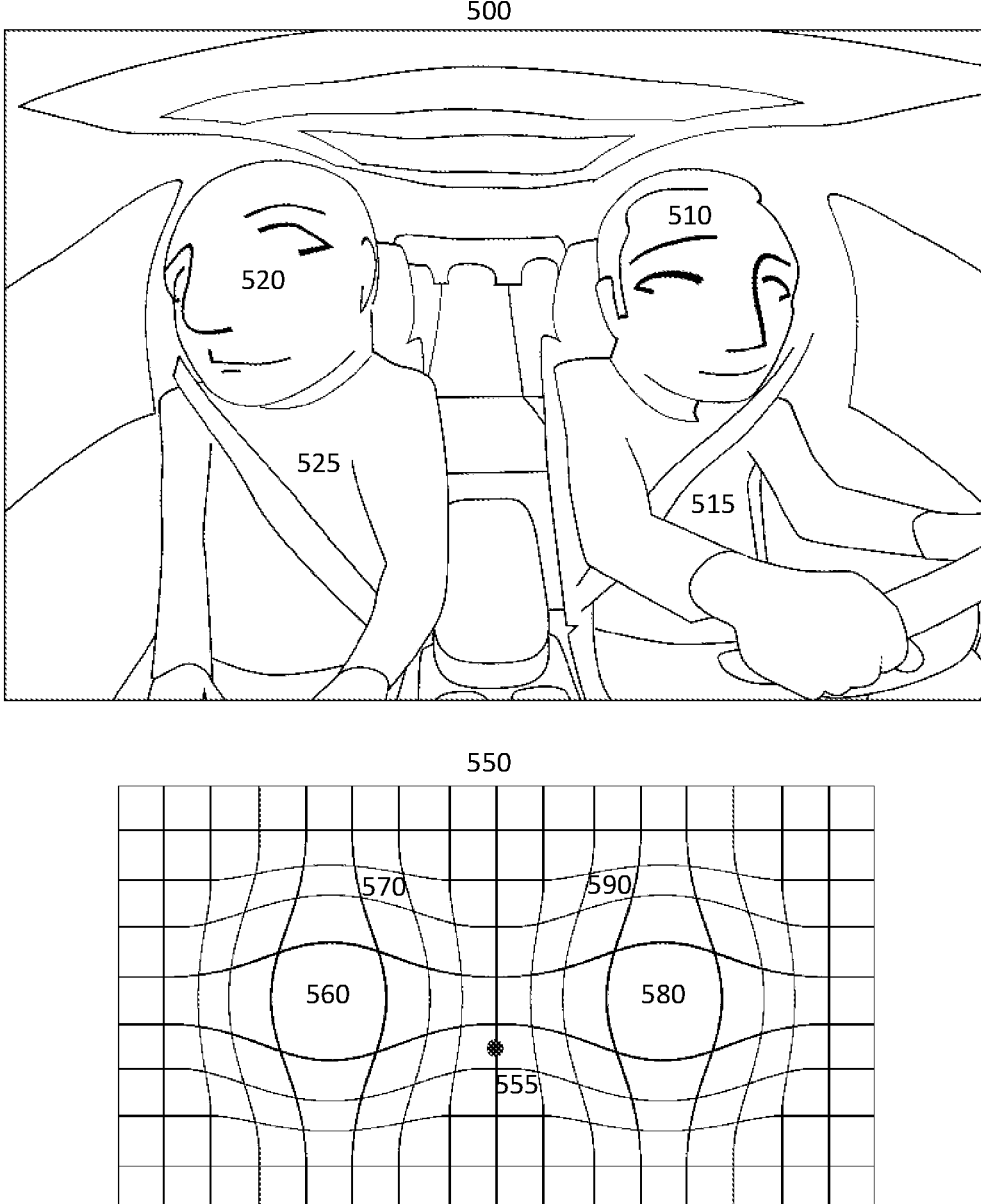
FIG. 5 shows how a dual-foveated imaging area can be used if both the driver and the passenger head have to be imaged in higher resolution.

FIG. 5 shows how a multi-foveated imaging area can be used if both the driver and the passenger heads have to be imaged in higher resolution. In this example of FIG. 5, there are two zones of increased magnification, but there could be any number of localized magnifications according to embodiments of the present invention. The image 500 shows the resulting image on the camera with an optical system creating two such zones of magnification, both on the driver 515 and the passenger 525 in order to have more pixels on their faces 510 and 520 respectively. The mesh 550 shows schematically these two zones of increased magnification 560 and 580, both of them being compensated by the respective zones of compressed magnification 570 and 590 to compensate for the magnified zone and thus allowing imaging of the same total field of view on the image sensor of the camera, without affecting the projection outside of the magnified zone. In this FIG. 5, the optical axis is represented by the dot 555, located at the center of the image sensor, but in some embodiments, the center of the optical image and the optical axis are offset with respect to the center of the image sensor.

Figure 6:
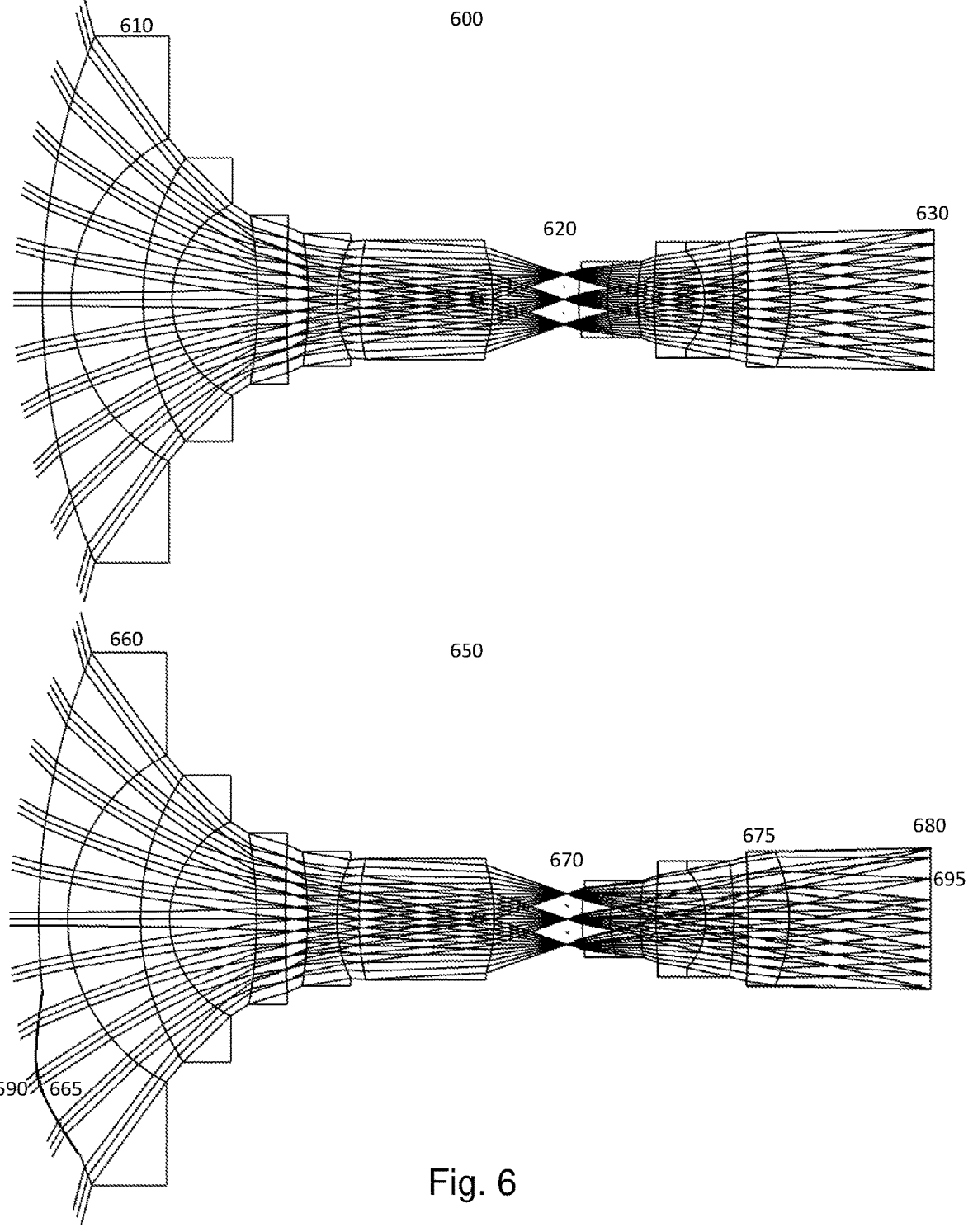
FIG. 6 shows the comparison of a typical wide-angle lens system layout without a foveated area and a wide-angle lens system layout with a foveated area.

FIG. 6 is a comparison of a typical wide-angle lens system layout without a foveated area and a wide-angle lens system layout with a foveated area. The top layout 600 shows a typical layout for a wide-angle lens having no special element with localized optical power. All the optical elements have rotational symmetry around the optical axis, being either of spherical type, aspherical type cylindrical type, symmetrical freeform type or any other type of element surface symmetrical about the optical axis (the symmetry can be rotational or planar about a plane X or Y or any other plane comprising the optical axis). In other words, the symmetry with respect to the optical axis of the optical system is one of a rotational symmetry around the optical axis or a planar symmetry about a plane comprising the optical axis. When the symmetry is a planar symmetry, the predetermined distance between the zone of interest and the optical axis can instead be measured between the zone of interest and the plane comprising the optical axis. The same is true for the reference region at the same predetermined distance, but in a different direction than the direction for the zone of interest. In this example layout 600, the first optical element 610 is made of a spherical surface on the object side. The 11 fields displayed are equally spaced at each 15° between +75° and −75°, for a total field of view of 150°. This total field of view is just an example according to the present invention, but the total field of view of the lens could be of any value according to the present invention, including from 1° to 300°. In some other embodiments according to the present invention, the total field of view of the optical system is wide-angle and is at least larger than 60° or ultra-wide angle and is at least larger than 100°. In this example layout 600, the projection of the wide-angle lens is a linear projection (also known as a f-theta lens), meaning that equally space fields in the objects space are creating equally spaced image points on the image plane 630. This projection is just an example to show the effect of the localized magnification, but any projection for the base image can be used according to the present invention. In the layout 600, there are 5 optical elements before the aperture stop 620 and 5 elements (including 2 doublets) after the aperture stop 620 but this is just an example and the optical system according to the present invention could have any number of elements.

The bottom layout 650 show a similar optical layout, but this time with at least one optical element having at least one feature of localized optical power. In this example, the at least one optical element with at least one feature of localized optical power is the front element 660 with a localized feature being the bump 665 off-centered from the optical axis on the object-side surface of this element. In other embodiments, the feature of localized optical power could be a depression instead of a bump depending on the required zone of interest and the base optical power of the optical element before adding this feature. This added feature of localized optical power can be defined inside an optical design software in various ways, including, but not limited to, using freeform surfaces, XY polynomials, grid sag surface, spline surfaces or the like. The location of this element far away from the aperture stop 670 allows a greater separation between the different fields, and is a preferred location to locate this localized feature creating a local magnification in the image. In other embodiments, this at least one optical element with localized optical power could be on any other optical surface, including the image-side surface of this first element 660, any surface of the second element or other elements in front of the aperture stop 670 or any optical element after the aperture stop 670. In some embodiments, the localized feature is located on the last optical element 675 since the beams of light for different fields are also well separated at that position far from the aperture stop. In other words, in some embodiments, the at least one of the plurality of optical elements with the added feature of localized power is one of the first optical element or the last optical element of the optical system. In other embodiments, more than 1 optical surface may have these features of local magnification, either to spread the increased optical power on multiple surfaces in order to limit the amplitude required of these features or to correct the optical aberrations caused by this localized feature. In some embodiments, there is at least one such surface with a localized optical power in front of the aperture stop and at least one such surface with a localized optical power after the aperture stop in order to create the localized magnification and balance the image quality simultaneously.

In the layout 650, the 11 fields displayed are still equally spaced on the object side at each 15° between +75° and −75°, for a total field of view of 150°. The field 690 thus corresponds to an angle of +45° in the object space with respect to the optical axis. In this example, this field 690 is at the center of the added magnification bump, and hence at the center of the magnification in the final image. On the image plane 680, the corresponding 11 image points are not equally spaced anymore, with the field from +45° that started at 690 and reaches the image plane 630 at location 695 being more distanced from its neighboring displayed fields +30° and +60° compared to the original layout 600. However, on the negative side, there is no such feature, and the fields are equally spaced in the image plane. In some embodiments, a half field of view of the optical system in the first direction is the same as a half field of view of the optical system in the second direction, but this is not always the case when the zone of interest is at the edge of the field of view and increasing or decreasing the half field of view in the direction of the zone of interest. The half field of view is defined here as the field of view from the optical axis to the edge of the image in a given direction. While the layout 650 is showing a 2D view of the optical system, it must be understood that the localized feature of magnified optical power 665 is a 3D structure that is not rotationally symmetrical around the optical axis. The optical systems of FIG. 6 include 10 optical elements with power, but in other embodiments of the method according to the present invention, the optical system includes between 6 and 12 optical elements with optical power. In other embodiments, there are between 8 and 10 optical elements in the optical systems.

While the above examples show some localized magnification zones as the zone 260 having some symmetry in X and in Y directions, in some other embodiments according to the present invention, the magnification zone can be of any shape, any size and of any magnification power. The same applies to the features creating these zones of localized magnification, they can be of any shape and any size. When the optical system is used to increase the resolution on the driver in an automotive case, the magnification could be on the whole face of the driver or only on the eyes. In some embodiments, there could even be multiple levels of added magnification, as for example a first larger zone of increased magnification with low added power for the whole face of the driver, and then an additional smaller zone of high added magnification on the eyes of the driver. In other words, in these embodiments, the at least one zone of interest can include more than one level of magnification. This could be done with two optical features (like bumps or any other shape) added either on the same optical surface (on top of each other) or on multiple optical surfaces of the optical system.

In some other embodiments according to the present invention, there are multiple surfaces with localized optical power and they have to be aligned all together in order to work together while keeping a good image quality. In these embodiments, each optical element in the optical system has an alignment feature to orient them all correctly inside a mechanical barrel. In this case, multiple ones of the plurality of optical elements may be aligned together using an alignment feature.

In some other embodiments according to the present invention, the added feature on an optical surface in order to create a zone of increased magnification can be made of the same material as the optical element on which it is located, allowing fabrication of the optical element in one step. This could include a glass molding process, plastic injection of the optical element inside a mold, diamond turning the optical element using a CNC machine or the like. In some other embodiments, the added feature could be made of a material different from the material of the optical surface on which it is located and fixed with any means, including optical adhesive or the like, as an example. In those embodiments, the method is such that the at least one feature of localized optical power is made from a material different from a material of the optical element on which the at least one feature of localized optical power is located. The localized feature, whether of the same material or a different material than the surface on which it is located, can be permanently fixed or temporarily fixed on the optical surface. In the latter case, it allows removal and replacement of the feature of localized power as desired. The optical surface and the added localized optical power can be made of any material according to the present invention. In some other embodiments, the localized feature can be made of a special material other than purely refractive, as a meta-material having a meta-surface, a liquid crystal material, a diffractive material, a reflective material a gradian index material or any other material than can redirect some of the rays of light in the area of interest compared to the standard optical surface without the added feature of localized optical power.

In some embodiments, the added optical feature creating the area of higher optical power can be made of a material having different properties in the color spectrum than the infrared spectrum. This could include metasurface or meta-material or any other material with adjustable refractive index depending on the color spectrum or depending on the angle of incidence of rays on the surface. In some embodiments, this added optical feature is totally invisible in the RGB color spectrum and creates an optical magnification only on the infrared part of the spectrum, allowing avoidance of the dewarping of the image in the color spectrum while still having the increased resolution in the infrared part of the spectrum. In some other embodiments, this optical feature creating the area of higher optical power can be an active optical element, including, but not limited to, liquid lenses, liquid crystal, segmented deformable elements including micro mirrors or micro lens array composed of liquid crystal, or the like. More generally, the material of the at least one feature of localized optical power may have properties in one part of the light spectrum different than in another part of the light spectrum, creating a magnification in the zone of interest in the first part of the light spectrum different than the magnification in the same zone of interest in the other part of the light spectrum.

In some other embodiments, the color spectrum for which the optical system is designed for can be any part of the electromagnetic spectrum, including ultraviolet, color, near infrared, far infrared or any other part of the spectrum. Instead of using an RGB-IR image sensor as shown in the example from FIG. 3, other kinds of image sensor covering any part of the spectrum can be used in the camera used with the optical system. As long as the image sensor has different filters on some pixels compared to other pixels, separate images can be extracted from the camera system and different processing can be applied depending on if the larger fov/lower resolution image is needed or if the narrower fov/higher resolution image is needed.

In some other embodiments, the image sensor can perform a smart binning process in order to have a different resolution in the zone of interest than in the rest of the image. For example, if all the pixels in an image sensor are 1 μm square, in the zone of interest, the image sensor could read every pixel, giving the maximum resolution of the image sensor. Outside of the zone of interest, the sensor could be doing 2×2 or 3×3 pixels binning in order to limit the captured information outside of the zone of interest and keep the resulting digital image file smaller.

In some embodiments, since the rotation of the optical system with respect to the orientation of the camera must be precise in order to have the area of interest at the right location in the object space, the focusing of the optical system with the image sensor can be done using an active alignment technique or using other techniques allowing to keep the orientation of the optical system as desired. In other words, according to some embodiments, an active alignment is used to align the optical system and the image sensor. This could be, for example, an inner barrel inside an outer barrel, the outer barrel being used for focusing the lens and the inner barrel being used for orienting the area of interest with the object scene and the required orientation of the sensor.

In addition to the method for creating a zone of interest, embodiments described herein are also directed to an optical system itself. More specifically, to an optical imaging system creating an optical image with a zone of interest. The system first includes a plurality of optical elements configured to create an optical image in an image plane, the optical elements having an optical axis. The system also includes at least one feature of localized optical power located on at least one of the plurality of optical elements, making the at least one optical element non-symmetrical with respect to the optical axis. The system is such that an optical image formed by the optical system and the at least one feature of localized optical power includes at least one zone of interest that is non-symmetrical with respect to the optical axis, the at least one zone of interest being located at a predetermined distance from the optical axis in a first direction and having a first magnification. Finally, the system is such that the optical image formed by the optical system and the at least one feature of localized optical power has a reference region located outside the zone of interest, the reference region being located at the predetermined distance from the optical axis in a second direction different than the first direction and having a second magnification different than the first magnification. In some embodiments, this optical system is disposed in an automobile cabin. In some other embodiments, this optical system is further configured such that at least one zone of interest is configured to image a driver or a passenger of the automobile.

All of the above are figures and examples show embodiments of the optical system with at least one zone of increased magnification using localized optical power on at least one surface. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for creating a zone of interest in an optical image, the method comprising:
    a. providing an optical system with an optical axis, the optical system comprising a plurality of optical elements configured to create an optical image in an image plane; and
    b. providing, on at least one of the plurality of optical elements, at least one feature of localized optical power making the at least one optical element non- symmetrical with respect to the optical axis;
    such that an optical image formed by the optical system and the at least one feature of localized optical power includes at least one zone of interest that is non-symmetrical with respect to the optical axis, the at least one zone of interest being located at a predetermined distance from the optical axis in a first direction and having a first magnification, and
    such that the optical image formed by the optical system and the at least one feature of localized optical power has a reference region located outside the zone of interest, the reference region being located at the predetermined distance from the optical axis in a second direction different than the first direction and having a second magnification different than the first magnification,
    wherein a half field of view of the optical system in the first direction is the same as a half field of view of the optical system in the second direction.

2. The method of claim 1, further comprising providing an image sensor at the image plane of the optical system to convert the optical image into a digital image.

3. The method of claim 2, wherein the image sensor is an RGB-IR image sensor.

4. The method of claim 3, wherein the RGB-IR image sensor creates a RGB digital image, the method further comprising providing a processor configured to receive the RGB digital image and to dewarp the RGB digital image to remove the at least one zone of interest.

5. The method of claim 3, wherein the RGB-IR image sensor creates an IR image, the method further comprising providing a processor configured to receive the IR image and to further process the IR image by an algorithm.

6. The method of claim 5, wherein the algorithm is configured to analyze a human face.

7. The method of claim 1, wherein the at least one of the plurality of optical elements with the at least one feature of localized power is one of the first optical element or the last optical element of the optical system.

8. The method of claim 1, wherein the at least one zone of interest comprises more than one level of magnification.

9. The method of claim 1, wherein multiple ones of the plurality of optical elements are aligned together using an alignment feature.

10. The method of claim 1, wherein the at least one feature of localized optical power is made from a material different from a material of the optical element on which the at least one feature of localized optical power is located.

11. The method of claim 10, wherein the material of the at least one feature of localized optical power has properties in one part of the light spectrum different than in another part of the light spectrum, creating a magnification in the zone of interest in the first part of the light spectrum different than in the other part of the light spectrum.

12. The method of claim 2, wherein an active alignment is used to align the optical system and the image sensor.

13. The method of claim 1, wherein the optical system comprises between 6 and 12 optical elements.

14. The method of claim 1, wherein a total field of view of the optical system is at least 60°.

15. The method of claim 1, wherein a difference of magnification between the zone of interest and the reference region is at least =10%.

16. An optical imaging system creating an optical image with a zone of interest, the system comprising:
    a. a plurality of optical elements configured to create an optical image in an image plane, the optical elements having an optical axis;
    b. at least one feature of localized optical power located on at least one of the plurality of optical elements, making the at least one optical element non-symmetrical with respect to the optical axis such that an optical image formed by the optical system and the at least one feature of localized optical power includes at least one zone of interest that is non-symmetrical with respect to the optical axis, the at least one zone of interest being located at a predetermined distance from the optical axis in a first direction and having a first magnification, and
    such that the optical image formed by the optical system and the at least one feature of localized optical power has a reference region located outside the zone of interest, the reference region being located at the predetermined distance from the optical axis in a second direction different than the first direction and having a second magnification different than the first magnification,
    wherein a half field of view of the optical system in the first direction is the same as a half field of view of the optical system in the second direction.

17. The optical system of claim 16 disposed in an automobile cabin.

18. The optical system of claim 17, wherein the at least one zone of interest is configured to image a driver or a passenger of the automobile.

* * * * *